United States Patent [19]

Harnish

[11] 4,265,299
[45] May 5, 1981

[54] HEAT PUMP CONTROL SYSTEM

[75] Inventor: James R. Harnish, York, Pa.

[73] Assignee: Borg-Warner Corporation, Chicago, Ill.

[21] Appl. No.: 79,859

[22] Filed: Sep. 28, 1979

[51] Int. Cl.³ .............................................. F25B 29/00
[52] U.S. Cl. ........................................ 165/12; 165/29
[58] Field of Search ..................................... 165/12, 29

[56] References Cited
U.S. PATENT DOCUMENTS 3,444,923  5/1969  Kyle et al. ............................. 165/29

Primary Examiner—Albert W. Davis
Attorney, Agent, or Firm—Thomas B. Hunter

[57] ABSTRACT

A control system for a heat pump having at least one stage of supplemental heaters, said control system including an electronic thermostat capable of (1) sensing the rate of change of the temperature in the (indoor) conditioned space; and (2) bringing on supplemental heat, following temperature setup of the thermostat, only if the rate of temperature change is below some predetermined value. A suitable time delay can be built into the control to allow the heat pump to stabilize and therefore give a more realistic indication of the ability of the heat pump to handle a given load.

6 Claims, 3 Drawing Figures

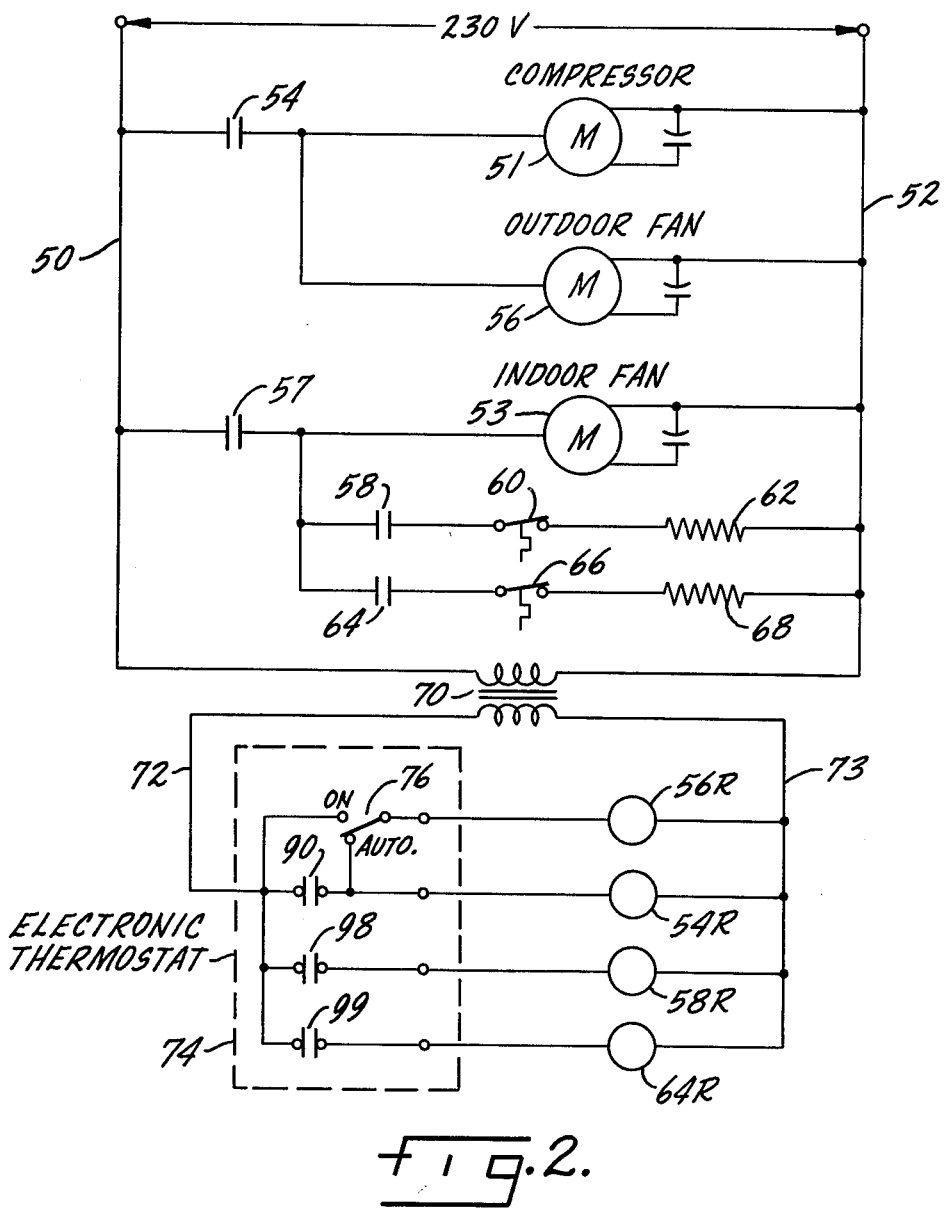

HEAT PUMP CONTROL SYSTEM

BACKGROUND OF THE INVENTION

1. Field of the Invention

Heating systems wherein the heat source is a reverse cycle refrigeration unit or heat pump, said systems being generally classified in Class 237, Subclass 2B.

2. The Prior Art

G. Sartorius (U.S. Pat No. 3,786,161) titled "Process and Apparatus for Monitoring and Control of Metallurgical Furnaces" discloses a concept for controlling a furnace as a function of the rate of temperature change. This, however is a very general teaching and fails to deal with the specific problems encountered in the design of heat pump systems and the control of supplemental heat.

W. Iberg et al (U.S. Pat. No. 3,993,120) titled "Space Thermostat" is directed to the concept of single thermostat adapted to control, in a selective manner, two stages of a multiple stage heating apparatus. The temperature sensing element is a bimetallic coil which does not measure the rate of temperature change and therefore differs in principle from the present invention.

A. Kompelien (U.S. Pat. No. 3,586,869) titled "Sequencing Control Unit" concerns a system utilizing solid state switching devices for sequencing stages of electric heat. The thermostat, however, is not of the type that can determine the rate of change of the temperature in the controlled space.

SUMMARY OF THE INVENTION

In a typical heat pump system, supplemental heaters, usually resistance heaters, are provided to furnish heat when the reverse cycle refrigeration system is incapable of handling the load. This occurs when outdoor temperatures become too low, rendering the heat pump inefficient in the heating mode. The point at which supplemental heat must be used to assist the heat pump, as the heating load increases, is referred to by the trade generally, and in this specification, as the "balance point".

In this case it is quite common to use a two-stage indoor space thermostat with the first stage operating the heat pump and the second stage controlling the supplemental heat. When the thermostat setting is raised, such as in the morning following a night-time setback to conserve energy, the supplemental heaters can be activated during milder weather when the heat pump alone could handle the heating load. In other words, the resetting of the thermostat to a higher temperature setting, say from 65° F. to 70° F. makes the heat pump control "think" that the load is greater than can be satisfied by the heat pump itself and so the control then activates one or more stages of the supplemental resistance heaters. Operation of the system with supplemental heat is wasteful of energy and increases operating costs.

The aforementioned problem may be solved in part by the use of an outdoor thermostat that will prevent operation of the supplemental heat at outdoor temperatures above the system balance point. Multiple outdoor thermostats are often specified by electric utility companies (for conservation purposes) so that increments of supplemental heat are staged as a function of outdoor temperature. For example, the first stage may be activated when the outdoor air temperature is below 45° F., the second stage below 40° F., and so on. These thermostats, in addition to being expensive, require on-site or field installation with its attendant high labor costs.

Moreover, even these complex, multiple thermostat systems do not solve the problem completely because the real, instantaneous balance point may shift as much as 20° F. in respect to the outdoor temperature because of the absence of wind, solar effect and internal heat sources, such as appliances, lights, people, etc. Thus, the outdoor temperature selected to represent the balance point condition is based on average or typical conditions and does not, in fact, sense the true balance point.

The present invention is directed to a system containing an electronic thermostat that can sense the rate of temperature change in the conditioned space. The thermostat includes two or more heating stages with the first stage controlling only heat pump operation. With the heat pump in operation (on heating), if the thermostat senses a temperature rise of approximately 1° F. per hour, or the temperature of the space is within 1.5° F. (typical) of the set point, it does not allow operation of the supplemental heat. Since the space thermostat determines that the temperature rate of change is such that the heat pump alone can handle the load, no supplemental heat should be required and activation thereof can be prevented without the use of outdoor thermostats.

The rate of temperature change can be sensed directly, or it can be referenced against the thermostat set point. In the latter case, a resetting of the thermostat to 70° F., when the night set back was 65° F., would result in the thermostat sensing the rate of change with respect to the 70° F. setting.

The rate of temperature rise decreases as it approaches the thermostat setting so that it is desirable to insure that the second stage of the thermostat will prevent activation of the supplemental heat as the space temperature approaches (is within about 1½° F.) of the thermostat set point.

A further refinement which may be included is a time delay feature. The thermostat can be designed to delay, for a period of about five minutes, its first "test" of temperature rise after the heat pump operation has been initiated. This is desirable because during the first few minutes of heat pump operation after a shut down period, the heat pump will not have approached its stabilized, full load capacity.

The same concept described above in respect to a first stage of supplemental heat can be expanded to a plurality of additional heaters. In other words assume that the thermostat calls for the first stage of supplemental heat and the rate of temperature change is still not within satisfactory limits, then the thermostat can call for a second heating stage to be activated and so forth for additional heating stages. Again, the time delays after initiation of any subsequent heating stage is desirable to allow the system to stabilize.

DESCRIPTION OF THE DRAWINGS

FIG. 2 is a schematic diagram of a heat pump control circuit in accordance with the principles of this invention.

DETAILED DESCRIPTION OF THE INVENTION

Figure 1:
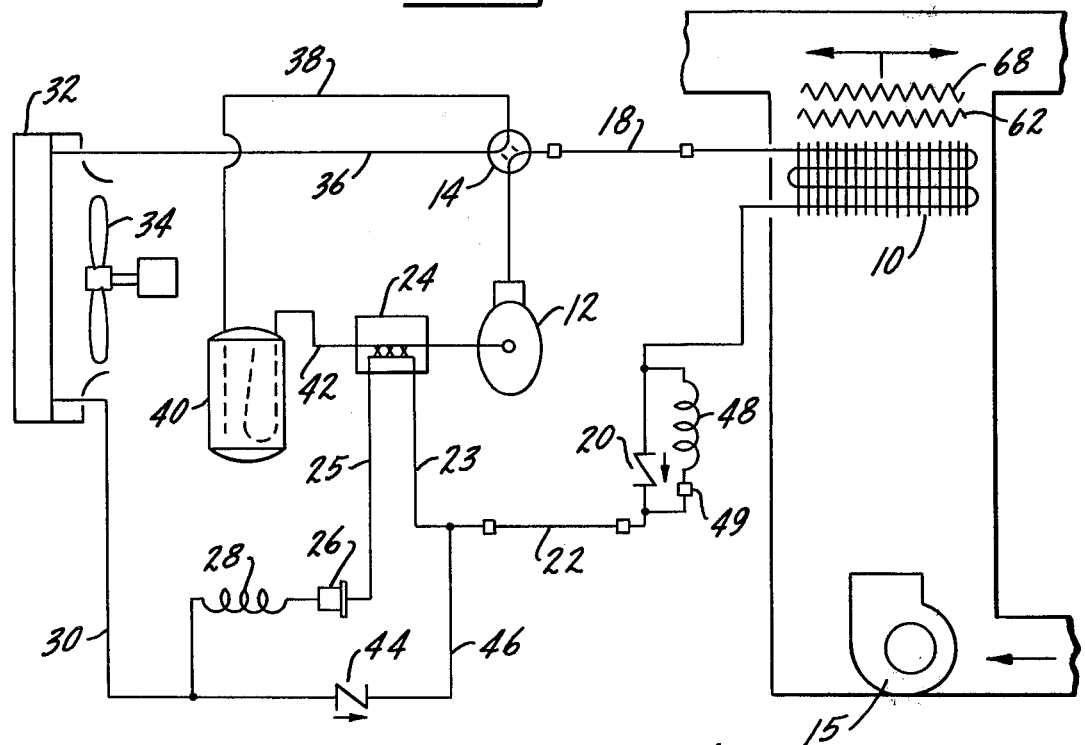
FIG. 1 is a schematic diagram of a typical reverse cycle refrigeration system or heat pump.

FIG. 1 shows a typical heat pump system for either heating or cooling a space as heat is pumped into or abstracted from an indoor coil 10. Refrigerant vapor is compressed in compressor 12 and delivered to a reversing valve 14, which, in its solid line position, indicates the heating mode for the system. Hot gas is delivered through line 18 to the indoor coil 10 where it rejects heat into the enclosed space by the circulation of room air thereof by means of a fan 15. The refrigerant then flows through check valve 20, which would then be in its full-flow position, to a heat exchanger 24 through lines 22 and 23. From the heat exchanger 24, refrigerant passes through line 25 to filter/drier 26 and then through a capillary 28 and line 30 to the outdoor coil 32. The refrigerant abstracts heat from the air flowing over the outdoor coil as circulated by fan 34 and then flows through lines 36 to reversing valve 14, and via line 38 to the suction line accumulator 40. It then passes in indirect heat exchange relation with refrigerant flowing through line 23 and heat exchanger 24 and continues through line 42 to the suction side of compressor 12 to complete the circuit.

In the cooling mode, the reversing valve 14 is moved to its dotted line position so that refrigerant vapor compressed in compressor 12 flows through line 36 to the outdoor coil 32 where it condenses. The liquid refrigerant then flows through line 30 and check valve 44, lines 46 and 22 through strainer 49 and capillary 48 to the indoor coil 10 which now functions as an evaporator. The heat is abstracted from the indoor air causing the refrigerant to vaporize. The low pressure vapor flows through line 18, reversing valve 14 and line 38 to the suction line accumulator 40. It returns to the compressor suction through line 42.

Referring now to FIG. 2 conductors 50 and 52 represent the supply conductors for a power supply, typically 230 v. AC. Connected across the power supply are: the compressor motor 51 controlled by relay switch 54; the outdoor fan motor 56 in parallel with compressor motor 51 and also under the control of relay switch 54; the indoor fan motor 53 under the control of relay switch 57; a first resistance heater 62 in series with relay switch 58 and thermal limit switch 60; and a second resistance heater 68 in series with relay switch 64 and thermal limit switch 66.

A transformer 70 is connected to the power supply 50, 52 and through conductors 72, 73 to provide to low voltage power supply (typically 24 v.) to the thermostat and control relays. The electronic thermostat 74, (whose components are within the area defined by the dotted line) includes a manual ON-AUTOMATIC switch 76 for the indoor fan controlled by relay 56R, a first stage switch 90 in series with compressor motor relay 54R, a second stage switch 98 in series with heater relay 58R and a third stage switch 99 in series with heater relay 64R controlling heater 68.

Figure 3:
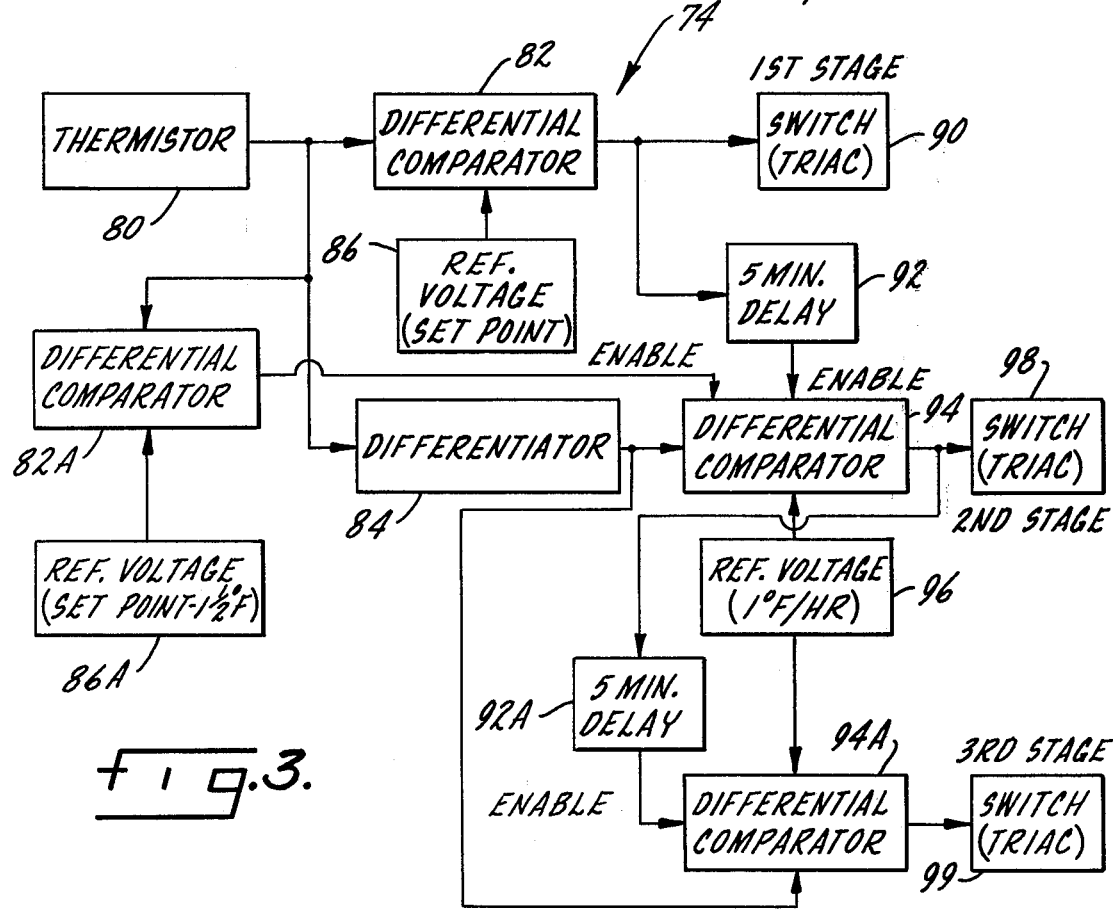
FIG. 3 is a detailed schematic diagram illustrating the design of the improved electronic thermostat used in the circuit of FIG. 2.

Referring to FIG. 3, the electronic thermostat 74 includes standard solid state components for accuracy and reliability. Thermistor 80 is located to sense the indoor, conditioned space temperature and provides an input signal at variable voltage (as a function of the temperature sensed) to differential comparators, 82, 82A and a differentiator 84. A reference voltage corresponding to the desired thermostat set point is supplied from the reference 86 to the differential comparator 82. For heating operation, the output of thermistor 80 is compared to the set point (reference voltage) 86 through comparator 82. If the space temperature is lower than the set point, the comparator 82 will turn on the first stage switch, triac 90, which will energize relay 54R, closing switch 54, to start the compressor motor 51 and the fan motor 56. The output of thermistor 80 is also run through differentiator 84 and into differential comparator 94 where the rate of change of room temperature is compared with a reference rate of change 96 (typical 1° F./hr). The output of thermistor 80 is also compared to $1\frac{1}{2}$° F. (typical) below the set point (reference voltage 86A) through comparator 82A. If the temperature of the space is $1\frac{1}{2}$° F. or more below the set point, comparator 82A will send an enabling signal to comparator 94. The output of comparator 82 turning on triac 90 is run through time delay 92 (5 minutes typical). When the time delay is over, it will send an enabling signal to comparator 94.

If each enabling signal is present from comparator 82A and time delay 92, and the rate of change of the space temperature, from differentiator 84, is below the reference rate of change 96, comparator 94 will energize triac 98, completing a circuit to energize relay 58R and closing switch 58 to activate heater 62.

The output from comparator 94 turning on triac 98 is run through time delay 92A (5 minutes typical). When the time delay is over it will send an enabling signal to comparator 94A. If the enabling signal is present from time delay 92A and the rate of change of the space temperature, from differentiator 84, is below the reference rate of change 96, comparator 94A will energize triac 99, completing a circuit to energize relay 64A and closing switch 64 to energize heater 68.

While this invention has been described in connection with a certain specific embodiment thereof, it is to be understood that this is by way of illustration and not by way of limitation; and the scope of the appended claims should be construed as broadly as the prior art will permit.

What is claimed is:

1. In combination with a heat pump of the type including at least one stage of supplemental heat, a control system comprising:
    temperature sensing means for sensing the indoor conditioned space temperature;
    means for comparing the temperature sensed with a reference temperature to determine the rate of temperature change in said indoor conditioned space temperature; and
    means for initiating supplemental heat following temperature setup of said temperature sensing means only if the rate of temperature change is below some predetermined value.

2. A system as defined in claim 1 wherein said temperature sensing means includes a two stage control with a first stage controlling the operation of said heat pump and second stage controlling the operation of said supplemental heat.

3. A system as defined in claim 2 wherein said second stage is initiated only if the space temperature is lower than the first stage setting.

4. A system as defined in claim 1 including more than one stage of supplemental heat; and means for initiating an additional stage if the temperature rate of change has not reached a desired level after operation with a lesser number of supplemental heater stages.

5. A system as defined in claim 2 including time delay means for delaying activation of supplemental heat to allow the system to establish equilibrium.

6. A system as defined in claim 4 including time delay means for delaying activation of supplemental heat to allow the system to establish quilibrium.

* * * * *

UNITED STATES PATENT AND TRADEMARK OFFICE
CERTIFICATE OF CORRECTION

PATENT NO. : 4,265,299
DATED : May 5, 1981
INVENTOR(S) : JAMES R. HARNISH

It is certified that error appears in the above—identified patent and that said Letters Patent is hereby corrected as shown below:

Column 4, line 68, cancel "quilibrium" and substitute -- equilibrium --.

Signed and Sealed this

Eighteenth Day of August 1981

[SEAL]

Attest:

GERALD J. MOSSINGHOFF

Attesting Officer    Commissioner of Patents and Trademarks